(12) United States Patent
Lintner et al.

(10) Patent No.: US 10,666,722 B2
(45) Date of Patent: May 26, 2020

(54) MESSAGE DELIVERY IN A DISTRIBUTED SERVER ENVIRONMENT

(71) Applicant: salesforce.com, inc., San Francisco, CA (US)

(72) Inventors: Andy Lintner, Pleasant Ridge, MI (US); Sivananda Reddy Thummala Abbigari, Fremont, CA (US); Hisham Ghazouli, Redwood City, CA (US); Fang Wong, Fremont, CA (US); Naveen Jaini, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 207 days.

(21) Appl. No.: 15/359,453

(22) Filed: Nov. 22, 2016

(65) Prior Publication Data
US 2018/0146034 A1    May 24, 2018

(51) Int. Cl.
*H04L 29/08* (2006.01)
*H04L 12/26* (2006.01)
(Continued)

(52) U.S. Cl.
CPC .......... *H04L 67/1034* (2013.01); *G06F 9/542* (2013.01); *G06F 9/546* (2013.01);
(Continued)

(58) Field of Classification Search
CPC ..... H04L 67/1034; H04L 43/16; H04L 67/02; G06F 9/542; G06F 9/546; G06Q 10/10; G06Q 50/01
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Jason D Recek
*Assistant Examiner* — Lesa M Kennedy
(74) *Attorney, Agent, or Firm* — Weaver Austin Villeneuve & Sampson LLP

(57) ABSTRACT

Disclosed are examples of systems, apparatus, methods, and computer program products for message delivery in a distributed server environment. In some implementations, a first dispatcher component can control an event stream. A first connection can be established between a first server and a client device. The first dispatcher component can identify a first event associated with the client device. A first message including an identifier can be generated. The first message can be provided to the client device. It can be determined that the first connection is unreliable. A second connection can be established with a second server responsive to receiving the identifier from the client device. A temporary second dispatcher component can be instantiated. The temporary second dispatcher component can identify a second event. A second message can be generated based on the second event. The second message can be provided to the client device.

20 Claims, 7 Drawing Sheets

(51) Int. Cl.
*G06F 9/54* (2006.01)
*G06Q 10/10* (2012.01)
*G06Q 50/00* (2012.01)

(52) U.S. Cl.
CPC ............ *G06Q 10/10* (2013.01); *G06Q 50/01* (2013.01); *H04L 43/16* (2013.01); *H04L 67/02* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |

(56) References Cited

U.S. PATENT DOCUMENTS

| | | |
|---|---|---|
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0240667 A1* | 10/2005 | Koegel ............... G06Q 10/10 709/223 |
| 2006/0218532 A1* | 9/2006 | Cordella ............. G06F 9/542 717/124 |
| 2007/0143481 A1* | 6/2007 | Roxburgh ........... H04L 63/18 709/227 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0223452 A1* | 8/2014 | Santhanam ........... G06F 9/541 719/328 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

PCT International Search Report and Written Opinion dated Feb. 2, 2018 issued in PCT/US2017/061045.

Curry, Edward, "Message-Oriented Middleware" *Middleware for Communications* pp. 1-28, 2004.

PCT International Preliminary Report on Patentability dated Oct. 15, 2018 issued in PCT/US2017/061045.

* cited by examiner

MESSAGE DELIVERY IN A DISTRIBUTED SERVER ENVIRONMENT

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to message delivery. More specifically, this patent document discloses techniques for message delivery in a distributed server environment.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
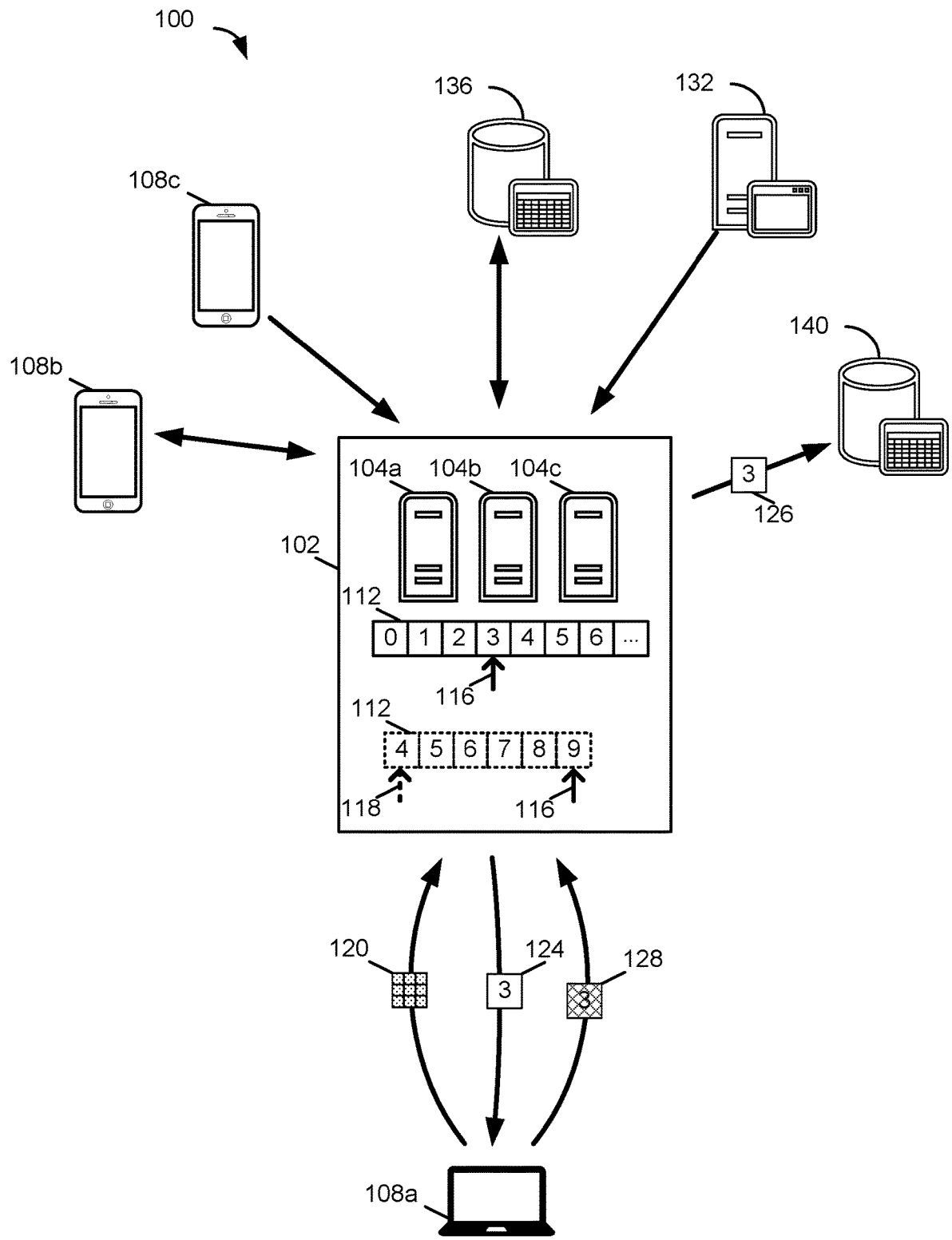
FIG. 1 shows a system diagram of an example of a system 100 for message delivery in a distributed server environment, in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some of the disclosed implementations of systems, apparatus, methods, and computer program products are configured for message delivery in a distributed server environment.

In message delivery environments, a load balancer can handle and distribute requests from client devices to one of many application servers available in an application server pool. For each client device connected to a server, events are maintained and stored at application servers. If an application server needs to be shut down or fails unexpectedly, client devices connected to the application server can no longer access previously stored events.

By way of illustration, Karthik has a problem with his smartphone. As such, he might initiate an online conversation through a customer service portal of the smartphone company. Navigating to the customer service portal, Karthik selects a button for a request for assistance, which causes a request from Karthik's computing device to be sent to an application server of a server system. The application server then establishes a conversation session between Karthik and Cormac, a customer service representative available to assist Karthik with his problem. The conversation between Cormac's device and Karthik's device is maintained by the application server. Unexpectedly, the application server fails because of technical difficulties. Consequently, Karthik is presented with an error indicating that he needs to initiate a new conversation. When Karthik initiates a new conversation, he is routed to a new server and a new customer service representative, and as such, Karthik has to repeat his explanation of the problem to the new customer service representative.

Using some of the disclosed techniques, client devices can now be transitioned from an unreliable server to another server in the server pool without interruption. Returning to the example above, a main dispatcher component can be configured to identify events from an event stream, messages can be generated based on the identified events, and the messages can be sent to client devices. For each message received by Karthik's client device, he also receives a corresponding identifier indicating a position in an event stream. When the first application server fails, Karthik's client device automatically establishes a new connection with a different server using the most recently received identifier. As Karthik's client device connects to the new server, a temporary dispatcher component is generated to "roll back" the event stream to the point in the event stream corresponding to the last received identifier, e.g., the identifier corresponding to the most recent message of the conversation between Karthik and Cormac. At the same time, the main dispatcher component adds new incoming events to a queue for delivery in a main event queue until the temporary dispatcher component finishes delivering messages. When the temporary dispatcher component finishes, the main dispatcher component begins delivering new conversation from Cormac to Karthik. As such, Karthik can avoid repeating an explanation to a new customer service representative.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

In some but not all implementations, the disclosed methods, apparatus, systems, and computer-readable storage media may be configured or designed for use in a multi-tenant database environment.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

FIG. 1 shows a system diagram of an example of a system 100 for message delivery in a distributed server environment, in accordance with some implementations. System 100 includes a variety of different hardware and/or software components in communication with each other. In the non-limiting example of FIG. 1, system 100 includes a server system 102, servers 104a-104c, at least one event stream 112, at least one service provider server 132, at least one enterprise record database 136, and at least one customer service log database 140. The components of system 100 might be in communication with client devices 108a-108c through a combination of networks, interfaces, and servers.

In FIG. 1, servers 104a-104c may communicate with other components of system 100. For example, servers 104a-104c can communicate with event stream 112. Servers 104a-104c can communicate with other servers, e.g., service provider server 132. And servers 104a-104c can communicate with other databases, e.g., enterprise record database 136 and customer service log database 140. Servers 104a-104c can also maintain message queues for delivering messages to client devices, e.g., client device 108a. In addition, servers 104a-104c may receive and process data requests from client devices 108a-108c. For example, client device 108a can send request 120 to server system 102, which might then be added to event stream 112. Upon receiving request 120, server 104a might begin processing the request 120 by using a dispatcher component configured to identify events relevant to certain client devices. Examples of events include, but are not limited to a chat message, a status change event, a record update event, a user-customized event, a login event, a selection of a data object, a workflow event, a system event, an indication that a webpage has been loaded, an indication of a mouse click, a change made to a record, etc. In some implementations, events can be stored in memory of server 104a for a specified amount of time such that past events can be identified when client device 108a reconnects to server system 102. Events can be processed by server 104a to generate messages for delivery to client devices 108a-108c. For example, server 104a can generate a message 124 based on an event and send it client device 108a.

In some implementations, server system 102 includes dispatcher component 116. Dispatcher component 116 can listen to and/or identify events in an event stream 112. Dispatcher component 116 can identify events in order to determine which events should be provided as messages, e.g., message 124. In some implementations, server 104a can also include a temporary dispatcher component 118 that can identify events according to the identifier in request 128. In other implementations, server 104a may retrieve data using events in event stream 112 and/or databases 136 and 140, combine some or all of the data using those sources, and send the combined data to client device 108a as a single HTTP response.

In FIG. 1, client devices 108a-108c may be a computing device capable of communicating with server system 102 and servers 104a-104c. Examples of client devices 108a-108c include: a desktop computer or portable electronic device such as a smartphone, a tablet, a laptop, a wearable device, a smart watch, etc. Client device 108a may send different types of data to server 104a. For example, client device 108a may send request 120. Also or alternatively, client device 108a can send event data and/or requests to update or change data stored in databases 136 and 140. In some implementations, when client device 108a establishes a connection with a server from server system 102, server system 102 assigns an affinity token to client device 108a. Client device 108a can use the affinity token to communicate with a particular server of server system 102.

In FIG. 1, service provider server 132 can include a live agent routing environment to manage many requests from many different client devices. In addition, the live agent routing environment can manage multiple requests by the same user. In some implementations, a status of each agent can be stored and used to route new customer concerns to particular agents. In addition, enterprise record database 136 can be configured to receive, transmit, store, update, and otherwise maintain record data stored in enterprise record database 136. In some implementations, enterprise record database 136 can store customer relationship management (CRM) records. Examples of CRM records include instances of accounts, opportunities, leads, cases, contacts, contracts, campaigns, solutions, quotes, purchase orders, etc. In some implementations, records of enterprise record database 136 are sent to client device 108a and stored in a client device cache. In addition, customer service log database 140 can be configured to receive, transmit, store, update, and otherwise maintain customer service log data stored in customer service database 140. For example, changes in statuses of agents, as well as, chat message history. Customer service log database 140 can facilitate near real-time processing of customer service log data to calculate aggregate information and perform machine-learning techniques.

Figure 2:
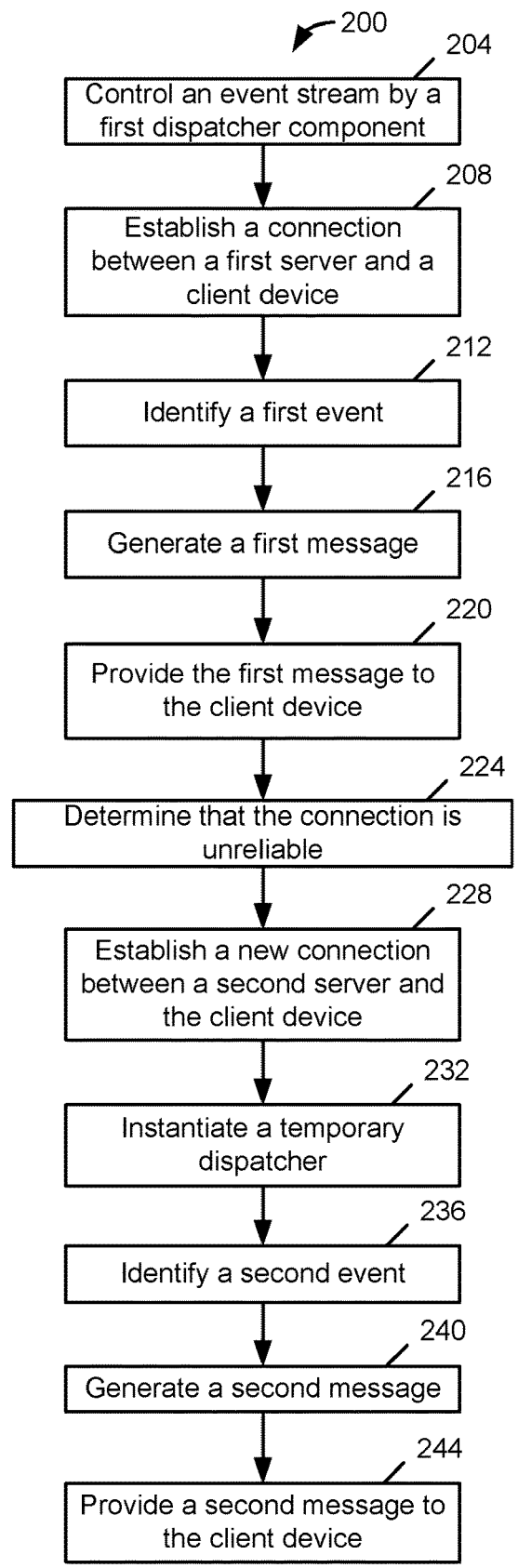
FIG. 2 shows a flow chart of an example of a method 200 for message delivery in a distributed server environment, in accordance with some implementations.

FIG. 2 shows a flow chart of an example of a method 200 for message delivery in a distributed server environment, in accordance with some implementations. Method 200 and other methods described herein may be implemented using system 100 of FIG. 1, although the implementations of such methods are not limited to system 100.

Figure 3B:
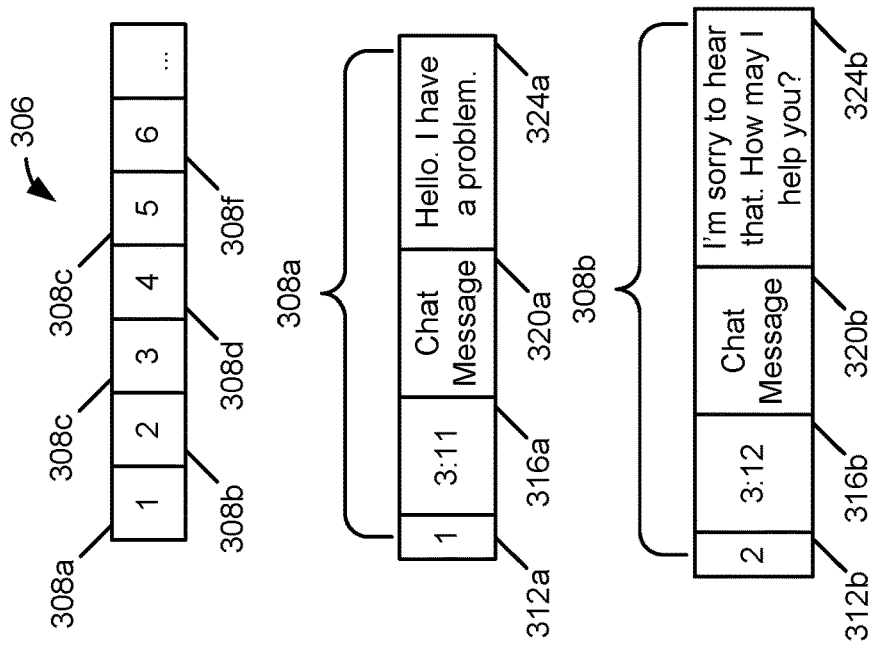
FIGS. 3A and 3B show examples of delivering chat messages in a distributed server environment, in accordance with some implementations.
Figure 3A:
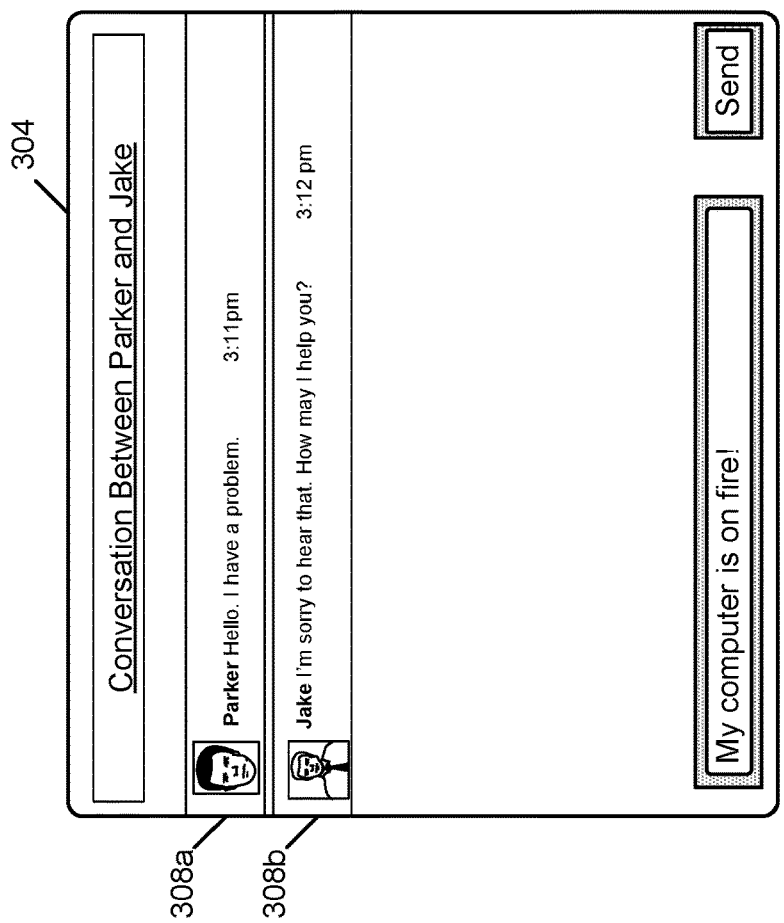

In block 204 of FIG. 2, server 104a of FIG. 1 instantiates a dispatcher component. In some implementations, the dispatcher component can be configured to control an event stream. An event stream might be particular to an organization of a multi-tenant database environment. For example, organization 1 would have one event stream only for events associated with organization 1, and organization 2 would have a different event stream associated only with events from organization 2. Event streams can include events received from different devices. For example, FIGS. 3A and 3B show examples of delivering chat messages in a distributed server environment, in accordance with some implementations. FIG. 3B shows an event stream 306 including events 308a-308f. An event stream can include data from many sources, e.g., "Parker" and "Jake" in FIG. 3A. Other sources include user interactions such as application-based interactions, user interactions from web-based interactions, telemetry data, or data change events, e.g., modifications to records. In some implementations, events can represent interactions with data controlled and/or maintained by the database system. In some implementations, events have identifiers that allow the events to be ordered in the event stream according to their respective identifiers. For example, if a first event is received by server system 102 at 10:00 AM and a second event is received by server system 102 at 10:01, the first event would be assigned an identifier earlier in the event stream than the second event. In some implementations, there is a main dispatcher component and a temporary dispatcher component (discussed further below). For example, a main dispatcher component can handle events at the head and/or front of the event stream. In some implementations, events can be associated with an event type. Event types include, but are not limited to: a chat message event type, a status change event type, a record update event type, a user customized event type, a social networking event type, a login event type, a selection of a data object event type, a workflow event type, a system event type, etc. To illustrate, an administrator configures an event type based on events relating to "Updates to Contact Records." As such, when a user's client device or any component of system 100 of FIG. 1 updates or otherwise modifies a contact record, an event can be provided to the event stream. For example, for each time Cormac makes a change to Karthik's contact record, an event representing that change can be provided to the event stream. In another illustration, an event type can be configured for a mobile application such that when a user views an item, that interaction is provided to the event stream.

In some implementations, events can include a portion of data representing metadata about the event and another portion of data representing the content of the event. For example, event metadata might include an identifier, a timestamp, and an event type. For instance, an identifier indicating that a chat message is the third most recent event in the event stream, a timestamp indicating that the chat message occurred at 5:01 PM, and an event type indicating "chat message." In the same example, event content can include an alphanumeric string, e.g., "Can you please fix my computer that I spilled coffee on?" In some implementations, events can be configured to remain in the event stream for a designated period of time, e.g., 5 minutes, 1 hour, 6 hours, 1 day, etc. Consequently, if the connection between server 104a and client device 108a is interrupted, events in the event stream that were relevant to client device 108a will still be included in event stream 112 when client device 108a establishes a new connection with a new server of server system 102.

In block 208 of FIG. 2, a connection is established between server 104a of FIG. 1 and client device 108a. In some implementations, a load balancer chooses a server of server system 102 and assigns an affinity token to client device 108a during the start of a connection session. Each client device that communicates with server system 102 can have an affinity token for one of the servers of server system 102. After being assigned an affinity token, communication occurs between the server associated with the affinity token and that client device. In some implementations, assignment of an affinity token can be based on balancing the network usage equally among servers of server system 102. For example, if server 104a is handling a large volume of communication with client devices, a load balancer could assign servers 104b or 104c to new client devices connecting to server system 102. In other implementations, affinity tokens can be made through round robin selection, without preference given to a particular server. For example, as a first client device connects, it might be assigned to server 104a, and as a second client device connects, it might be assigned to server 104b. Likewise, as a third client device connects, it might be assigned to server 104c. The process can repeat itself such that after every server has been assigned to one client device, as a fourth client device connects, it might be assigned an affinity token to server 104a.

In some implementations, once a connection is established between a server and a client device, notwithstanding a technical difficulty and/or an administrator causing a disconnection, the connection may persist until a client device disconnects from the server, e.g., a user navigates away from a website associated with the server. Consequently, communication between a server and a client device remains uninterrupted, allowing new requests and responses to be sent without the client device reconnecting to the server.

In block 212 of FIG. 2, an event is identified. In some implementations, an event is identified using the dispatcher component of block 204. Events may be associated with a client device, e.g., client device 108a of FIG. 1. In some implementations, there may be a main dispatcher component configured for each server of server system 102. For example, server 104a may include a first dispatcher component, and server 104b includes a second dispatcher component. In other implementations, a single dispatcher component can be configured to handle events from each server of server system 102. As such, one dispatcher component can handle events across event stream 112 for servers 104a-104c. In some implementations, dispatcher components identify events from event stream 112 according to client devices being subscribed to event types. In the example of FIG. 3B, event 308a includes an event type 320a of "Chat Message." Likewise, event 308b includes an event type 320b of "Chat Message." The client devices used by Parker and Jake can both be subscribed to event types 320a and 320b. In another implementation using FIG. 3A, the event generated for Parker's chat message to Jake might include an event type for "chat message between Parker and Jake." Similarly, an event generated for a chat message by another user, Joel, that is to be sent to Jake might include a type for "chat message between Joel and Jake." In some scenarios, an administrator of an enterprise computing environment might want different devices to receive the same message. As such, events can be configured to have multiple types, for instance, a "chat message type" and "chat message between user 1 and user 2 type." By way of example, dispatcher component 116 of FIG. 1 can identify the third event in event stream 112 as being associated with client device 108a and customer service log database 140. Client device 108a might be identified as associated with the third event of event stream 112 because the third event includes a first event type of "chat message between Parker and Jake." Whereas customer service log database 140 might be identified as associated with the third event of event stream 112 because the third event also includes a second event type of "chat message." As discussed further below, messages 124 and 126 might then be provided to client device 108a and customer service log database 140 respectively.

Figure 4:
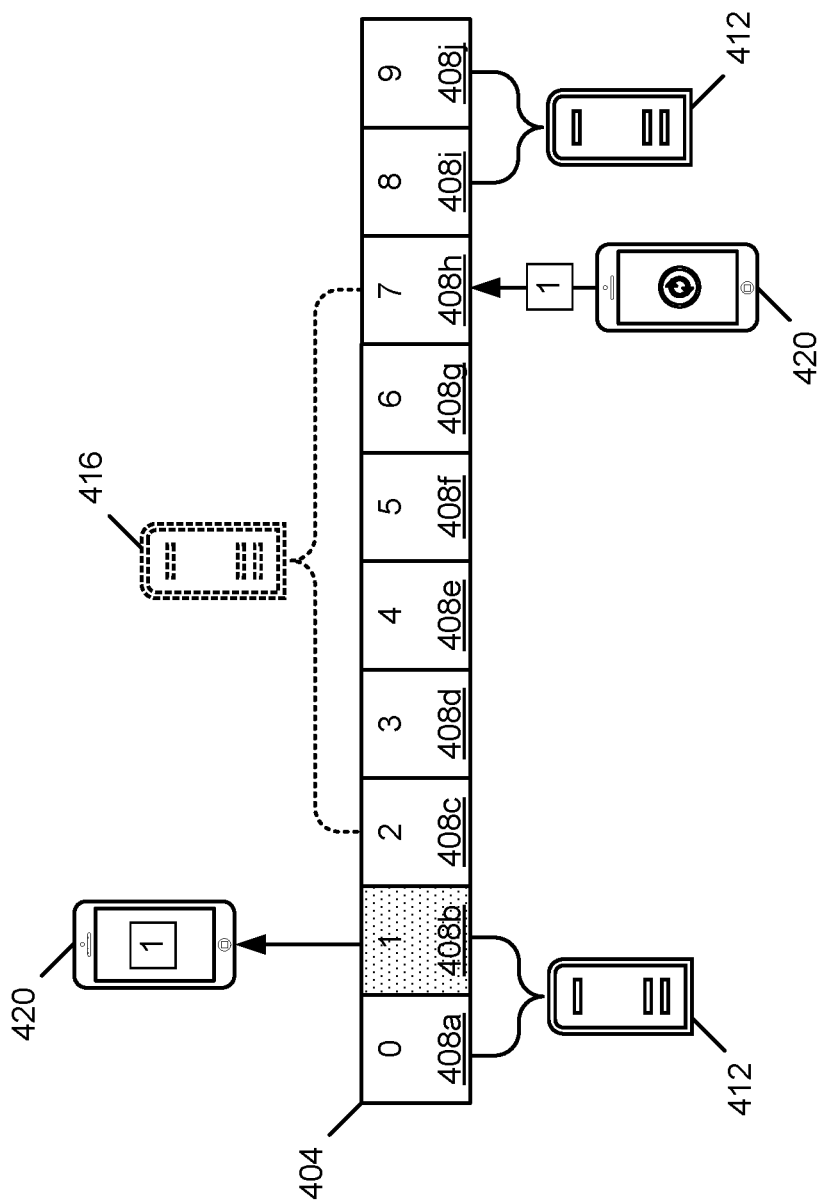
FIG. 4 shows an example of an event stream, in accordance with some implementations.

In some implementations, many events can be identified as part of block 212 of FIG. 2. For example, FIG. 4 shows an example of an event stream, in accordance with some implementations. In FIG. 4, dispatcher component 412 can control event stream 404. In this example, dispatcher component 412 can identify events 408a and 408b. When many events are identified by dispatcher component 412, some of the events identified might be out of sequential order, e.g., two events can be identified at positions 1 and 2, and a third event can be identified at position 5. In another example using FIG. 4, dispatcher component 412 identifies events 408a and 408b, and dispatcher component 412 also identifies events 408e and 408i.

In block 216 of FIG. 2, a first message is generated. Messages can include identifiers representing positions in event streams. In some implementations, the first message is generated based on the first event. Also or alternatively, many messages are generated and added to a message queue for delivery to the client. Each message in a particular message queue may have an identical event type. Returning to the example described above, when many events are identified as part of block 212, the event content of each of those events can be used to generate a message to be sent to client device 108a. In this example, one identifier might be included in the message, e.g., the identifier representing the most recent event.

In block 220 of FIG. 2, the message of block 216 is provided to client device 108a of FIG. 1. For example, server 104a might send message 124 to client device 108a. In some implementations, message 124 might be an HTTP response. HTTP responses can include a status, e.g., a client's request successfully received; response header fields, e.g., content type=text/html, server ID, or identifier; and event content, e.g., "How may I help you?" In some implementations, a message can include a header without event content, for instance, a message may be provided to client device 108a with an identifier corresponding to an event indicating a customer service representative is available.

In block 224 of FIG. 2, it is determined that the connection between client device 108a and server 104a is unreliable. In some implementations, client device 108a may become disconnected from server 104a because of technical difficulties, e.g., software bug, memory leak, connectivity issues, overheating, or because of administrator's manual shutdown of server 104a, e.g., for routine maintenance, installation of software updates, etc. In one example, client device 108a attempts a request for available new events, but server system 102 determines that the request was unsuccessful. As such, server system 102 may remove an affinity token (discussed above) between client device 108a and server 104a. Upon removal, the request can be routed to an available server, e.g., server 104b, and a new affinity token is assigned. In some implementations, reliability of server 104a can be determined according to reliability indicators such as, whether memory usage of server 104a exceeds a memory usage threshold, e.g., excessive memory consumption due to a memory leak causing systems to slow down, whether one or more hypertext transfer protocol services are operating at server system 104a, e.g., commands to retrieve or send data are no longer operable; whether server 104a can receive events; or whether the first server is identifiable in the event stream, e.g., server 104a has not identified events in the past 2 seconds, 20 seconds, 2 minutes, etc. In some implementations, for planned maintenance, an administrator can configure a manual transition from one server to other available servers. For example, server system 102 can be configured to determine that the connection of server 104a is unreliable at a particular time, e.g., 11:59 PM. Server system 102 would then begin the process of routing requests from server 104a to other servers of server system 102.

In block 228 of FIG. 2, a new connection is established between client device 108a and server 104b. In some implementations, the connection is established in response to server system 102 receiving the identifier in block 216 of FIG. 2. Returning to the example above, in some implementations, the request is modified by server system 102 of FIG. 1 and sent to server 104b. For example, request 128 can include the identifier received from message 124. Request 128 can be modified by server system 102 and sent to server 104b. The modified request can include the identifier indicating a third position of event stream 112. Also or alternatively, the modified request can include authentication information to re-authenticate client device 108a for communication with system 100.

In block 232 of FIG. 2, a temporary dispatcher component 118 of FIG. 1 is instantiated. In some implementations, temporary dispatcher component 118 can be different and distinct from dispatcher component 116. Temporary dispatcher component 118 can be configured to identify events of the event stream using the identifier of a modified request. Temporary dispatchers can also be configured to provide messages only to one client device, e.g., client device 108a of FIG. 1. Likewise, if client device 108b and 108c were disconnected to server 104a, two temporary dispatchers might be instantiated for each respective device according to the respective identifiers provided.

In some implementations, a temporary dispatcher component can be configured to identify events in the event stream up until a particular point in the event stream, for instance, the head of the event stream at the moment when a client device establishes a connection with a new server. By way of example, the head of the event stream 404 in FIG. 4 is event 408h, which might be the moment when client device 420 establishes a connection with a new server. After event 408h is identified as the head of event stream 404, dispatcher component 412 identifies events in the event stream after event 408h. As shown in FIG. 4, dispatcher component 412 can identify events 408i and 408j.

In block 236 of FIG. 2, a second event is identified using temporary dispatcher component 118 of FIG. 1. In some implementations, temporary dispatcher component 118 identifies events from the event stream according to a position of the event, for instance, the identifier of request 128 including a position of 408c. As discussed above, temporary dispatcher components can be configured to identify events associated only with a particular client device, e.g., client device 108a. To illustrate using the example of FIG. 4, temporary dispatcher component 416 might identify events 408c-408h. Also or alternatively, temporary dispatcher component 416 might identify a portion of the events from the group of 408c-408h. For example, temporary dispatcher component 416 might identify only event 408c and 408g as being associated with client device 420, and as such, temporary dispatcher component would only identify events 408c and 408g as part of block 236 of FIG. 2. In some implementations, a main dispatcher component also identifies new events entering the event stream while a temporary dispatcher component is identifying events. For example, as temporary dispatcher component 416 identifies events from among events 408c-408h, dispatcher component 412 identifies events entering the event stream after temporary dispatcher component 416 started identifying events, e.g., events 408i and 408j.

In block 240 of FIG. 2, a second message is generated. In some implementations, the second message is based on one or more events identified in block 236. In some implementations, a message includes a group of messages from a temporary message queue. In some implementations, the messages in the temporary message queue are associated with an identical event type and a first client device, for instance, "a chat message type" and client device 108a of FIG. 1. In some implementations, groups of messages can be identified. Also or alternatively, each of the messages in the group may have an identical event type and an association with client device 108a. In other implementations, returning to the example above in the paragraph above, a message can also be generated based on new events identified by the main dispatcher component while the temporary dispatcher component is identifying events. In this example, the events identified by the main dispatcher can be stored in a queue for delivery immediately after the message of block 240 of FIG. 2.

In block 244 of FIG. 2, the second message of block 240 is provided to client device 108a of FIG. 1. The second message can be provided to client device 108a using server 104b. The manner of providing the second message in block 244 of FIG. 2 can be similar to the first message provided in block 220. In some implementations, the message from server 104b includes the most recent identifier at the head of the event stream, for instance, "9" in FIG. 1. Also or alternatively, the message can include a new affinity token for communication between client device 108a and server 104b. In some implementations, after the message in block 240 of FIG. 2 is provided, the temporary dispatcher component of block 232 is removed after the second message is provided to the first client device. For example, temporary dispatcher component 416 can be removed after a message based on events 408c-408h is provided to client device 420. As discussed above, the message generated according to events identified by the main dispatcher, e.g., 408i and 408j, can also be provided to client device 420. In some implementations, the message is provided in response to an indication that the message in block 244 of FIG. 2 has been provided to a client device.

Systems, apparatus, and methods are described below for implementing database systems, enterprise social networking systems, enterprise computing environments, and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 5A:
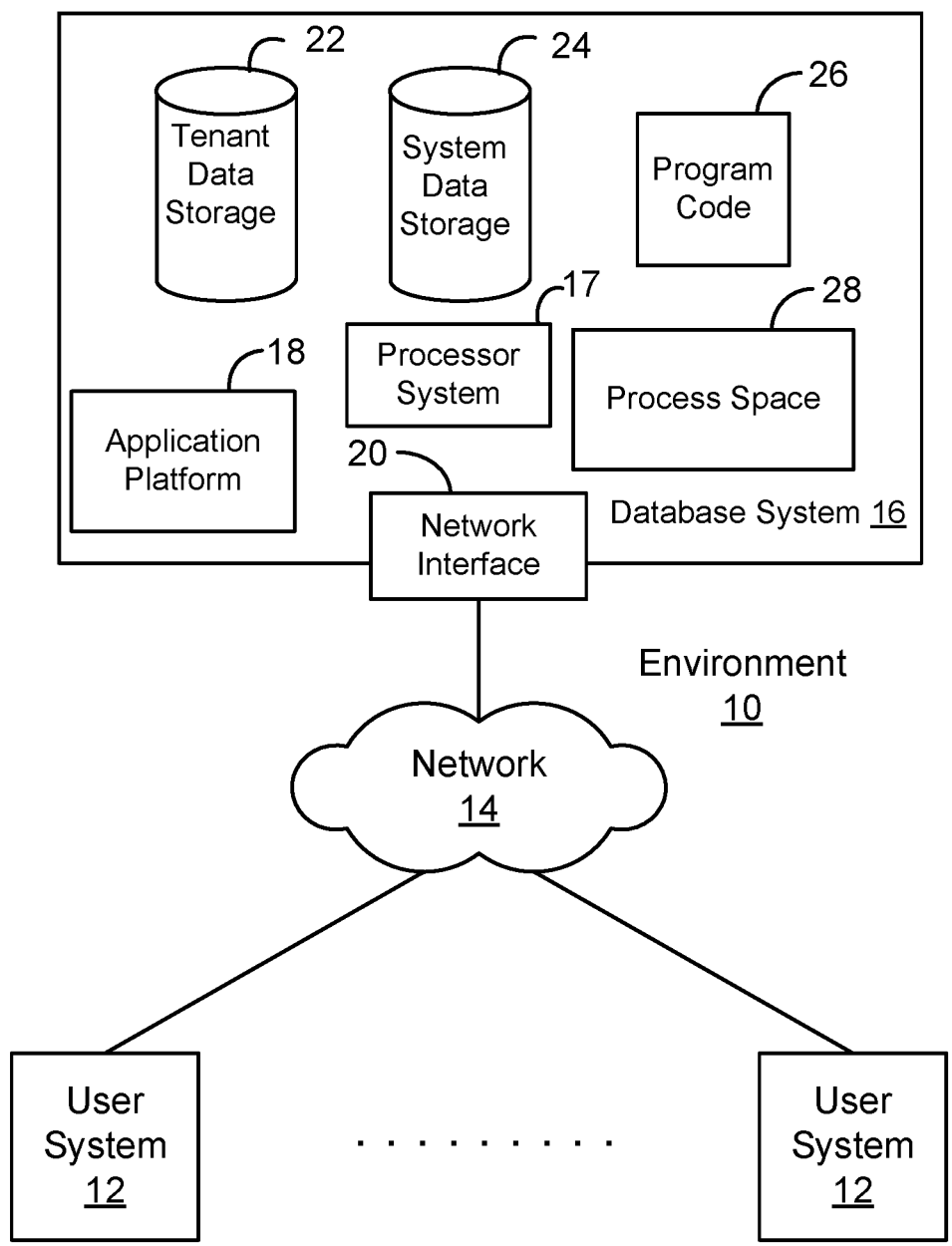
FIG. 5A shows a block diagram of an example of an environment 10 in which an on-demand database service can be used in accordance with some implementations.

FIG. 5A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 5A (and in more detail in FIG. 5B) user systems 12 might interact via a network 14 with an on-demand database service, which is implemented in the example of FIG. 5A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 5A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 5B:
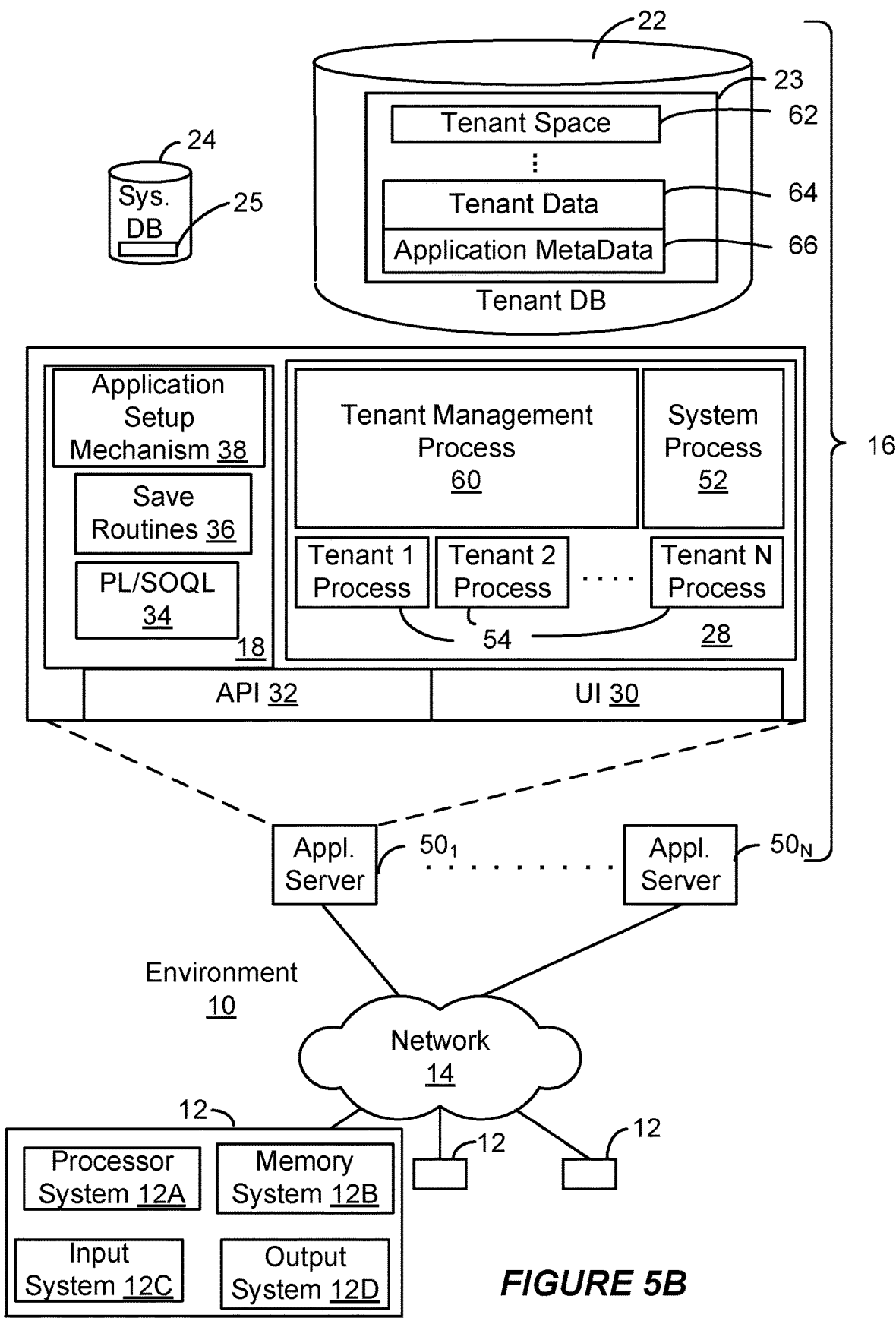
FIG. 5B shows a block diagram of an example of some implementations of elements of FIG. 5A and various possible interconnections between these elements.

One arrangement for elements of system 16 is shown in FIGS. 5A and 5B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 5A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or other hardware processor. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 5B shows a block diagram of an example of some implementations of elements of FIG. 5A and various possible interconnections between these elements. That is, FIG. 5B also illustrates environment 10. However, in FIG. 5B elements of system 16 and various interconnections in some implementations are further illustrated. FIG. 5B shows that user system 12 may include processor system 12A, memory system 12B, input system 12C, and output system 12D. FIG. 5B shows network 14 and system 16. FIG. 5B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 5A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 5B, system 16 may include a network interface 20 (of FIG. 5A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server 50₁ might be coupled via the network 14 (e.g., the Internet), another application server 50_{N-1} might be coupled via a direct network link, and another application server 50_N might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 6A:
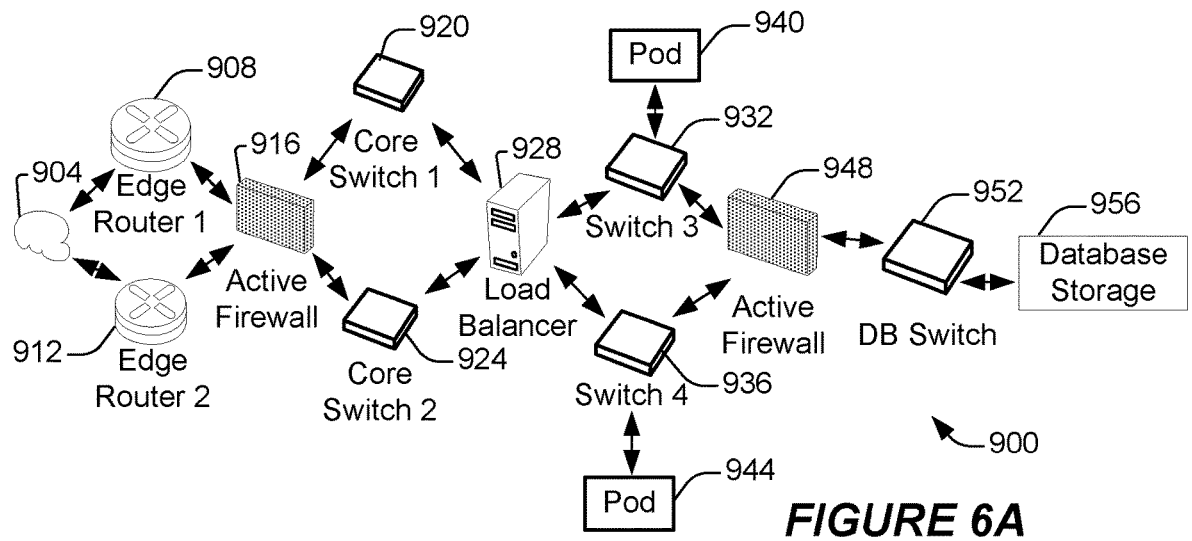
FIG. 6A shows a system diagram of an example of architectural components of an on-demand database service environment 900, in accordance with some implementations.

FIG. 6A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 6B:
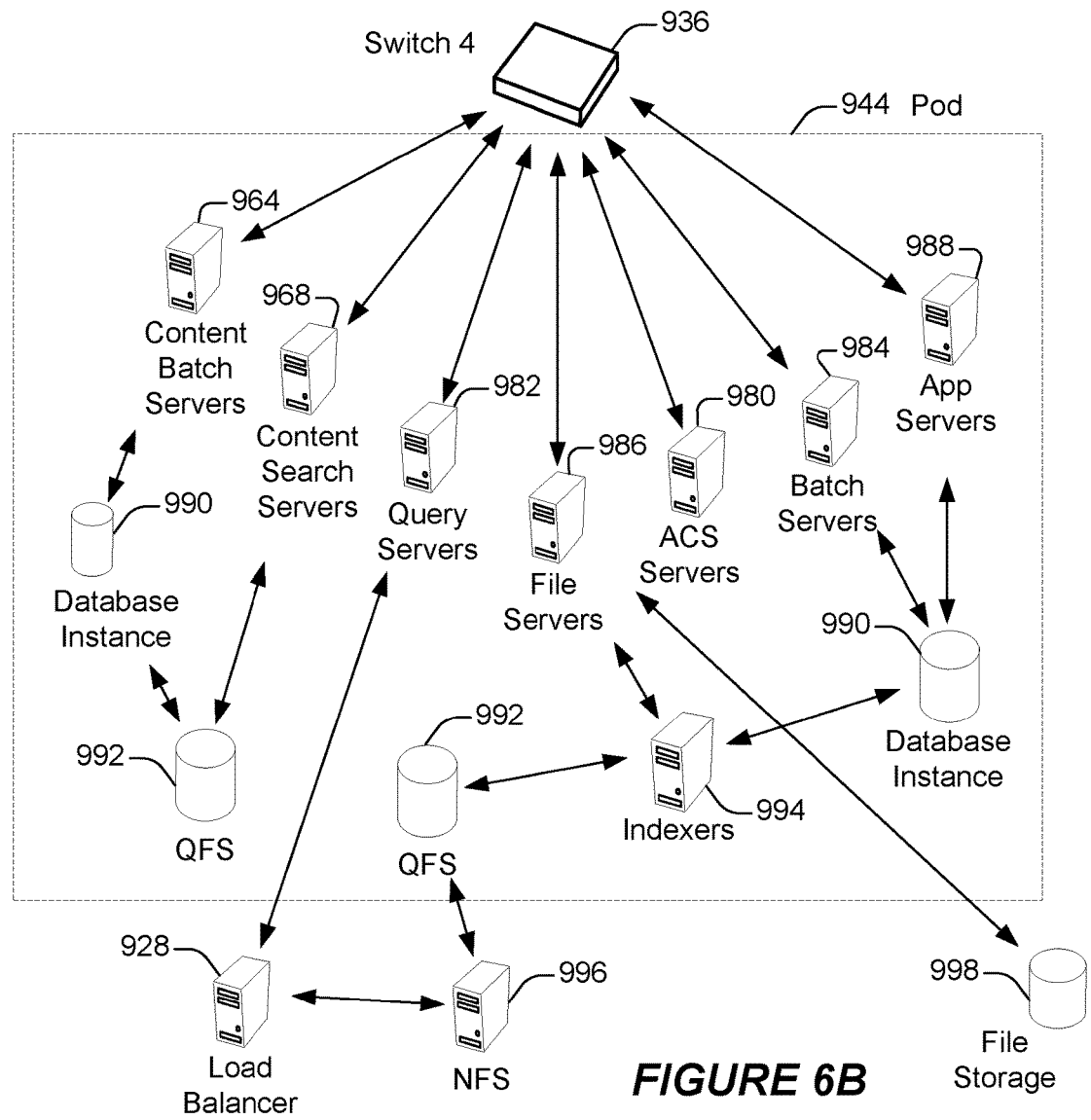
FIG. 6B shows a system diagram further illustrating an example of architectural components of an on-demand database service environment, in accordance with some implementations.

As shown in FIGS. 6A and 6B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 6A and 6B, some implementations of an on-demand database service environment may include anywhere from one to many devices of each type. Also, the on-demand database service environment need not include each device shown in FIGS. 6A and 6B, or may include additional devices not shown in FIGS. 6A and 6B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 6B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 6A and 6B.

FIG. 6B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs. In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

Some but not all of the techniques described or referenced herein are implemented as part of or in conjunction with a social networking database system, also referred to herein as a social networking system or as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail herein.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a GUI on a display device such as the display of a computing device as described herein. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail herein, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned herein, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail herein. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network.

A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a server system comprising one or more processors configurable to cause:
controlling, using a first dispatcher component, an event stream comprising a plurality of events associated with one or more of a plurality of devices, the events representing interactions with data maintained by the server system, each event being associated with an event type;
identifying, by the server system, using the first dispatcher component, a first event of the events, the first event being associated with a first client device of the devices, the first client device having a first connection with a first server of the server system;
generating, by the server system, a first message based on the first event, the first message comprising an identifier indicating a position of the first event in the event stream;
providing, by the first server, the first message to the first client device;
determining, by the server system, that the first connection between the first client device and the first server is unreliable;
establishing, by the server system, responsive to receiving the identifier from the first client device, a second connection between the first client device and a second server of the server system;
instantiating, by the server system, responsive to establishing the second connection between the first client device and the second server, a temporary second dispatcher component different from the first dispatcher component;
identifying, by the server system, using the temporary second dispatcher component, a second event of the events according to the position of the first event in the event stream as indicated by the received identifier;
queuing, by the server system, using the first dispatcher component, one or more further events added to the event stream during instantiation of the temporary second dispatcher component;
generating, by the server system, a second message based on the second event;
providing, by the second server, the second message to the first client device;
generating, by the server system, responsive to a signal indicating suspension or removal of the temporary second dispatcher component, one or more further messages based on the queued one or more further events; and
providing, using the first dispatcher component, the one or more further messages to the first client device.

2. The system of claim 1, the one or more processors further configurable to cause:
responsive to identifying the second event, identifying, using the first dispatcher component, a third event of the events;
generating a third message based on the third event, the third message comprising a further identifier; and
responsive to providing the second message to the first client device, providing, by the second server, the third message to the first client device.

3. The system of claim 1, wherein the temporary second dispatcher component is configured to identify events associated only with the first client device.

4. The system of claim 1, the one or more processors further configurable to cause:
removing the temporary second dispatcher component in response to providing the second message to the first client device.

5. The system of claim 1, wherein the determination that the first connection is unreliable is based on one or more reliability indicators, the reliability indicators comprising one or more of: whether memory usage of the first server exceeds a memory usage threshold, whether one or more hypertext transfer protocol services of the first server are identifiable, or whether the first server is identifiable in the event stream.

6. The system of claim 1, wherein the first message further comprises event content from a group of events identified by the first dispatcher component, each event of the first group of events being associated with an identical event type.

7. The system of claim 1, wherein the event type comprises one or more of: a chat message event type, a status change event type, a record update event type, a user customized event type, a social networking event type, a login event type, a selection of a data object event type, a workflow event type, or a system event type.

8. A method comprising:
controlling, using a first dispatcher component, an event stream comprising a plurality of events associated with one or more of a plurality of devices, the events representing interactions with data maintained by a server system, each event being associated with an event type;
identifying, by the server system, using the first dispatcher component, a first event of the events, the first event being associated with a first client device of the devices, the first client device having a first connection with a first server of the server system;
generating, by the server system, a first message based on the first event, the first message comprising an identifier indicating a position of the first event in the event stream;
providing, by the first server, the first message to the first client device;
determining, by the server system, that the first connection between the first client device and the first server is unreliable;
establishing, by the server system, responsive to receiving the identifier from the first client device, a second connection between the first client device and a second server of the server system;
instantiating, by the server system, responsive to establishing the second connection between the first client device and the second server, a temporary second dispatcher component different from the first dispatcher component;
identifying, by the server system, using the temporary second dispatcher component, a second event of the events according to the position of the first event in the event stream as indicated by the received identifier;

queuing, by the server system, using the first dispatcher component, one or more further events added to the event stream during instantiation of the temporary second dispatcher component;

generating, by the server system, a second message based on the second event;

providing, by the second server, the second message to the first client device;

generating, by the server system, responsive to a signal indicating suspension or removal of the temporary second dispatcher component, one or more further messages based on the queued one or more further events; and providing, using the first dispatcher component, the one or more further messages to the first client device.

9. The method of claim 8, the method further comprising:

responsive to identifying the second event, identifying, using the first dispatcher component, a third event of the events;

generating a third message based on the third event, the third message comprising a further identifier; and responsive to providing the second message to the first client device, providing, by the second server, the third message to the first client device.

10. The method of claim 8, wherein the temporary second dispatcher component is configured to identify events associated only with the first client device.

11. The method of claim 8, the method further comprising:

removing the temporary second dispatcher component in response to providing the second message to the first client device.

12. The method of claim 8, wherein the determination that the first connection is unreliable is based on one or more reliability indicators, the reliability indicators comprising one or more of: whether memory usage of the first server exceeds a memory usage threshold, whether one or more hypertext transfer protocol services of the first server are identifiable, or whether the first server is identifiable in the event stream.

13. The method of claim 8, wherein the first message further comprises event content from a group of events identified by the first dispatcher component, each event of the first group of events being associated with an identical event type.

14. The method of claim 13, wherein the event type comprises one or more of: a chat message event type, a status change event type, a record update event type, a user customized event type, a social networking event type, a login event type, a selection of a data object event type, a workflow event type, or a system event type.

15. A computer program product comprising computer-readable program code to be executed by one or more processors when retrieved from a non-transitory computer-readable medium, the program code comprising instructions configurable to cause:

controlling, using a first dispatcher component, an event stream comprising a plurality of events associated with one or more of a plurality of devices, the events representing interactions with data maintained by a server system, each event being associated with an event type;

identifying, by the server system, using the first dispatcher component, a first event of the events, the first event being associated with a first client device of the devices, the first client device having a first connection with a first server of the server system;

generating, by the server system, a first message based on the first event, the first message comprising an identifier indicating a position of the first event in the event stream;

providing, by the first server, the first message to the first client device;

determining, by the server system, that the first connection between the first client device and the first server is unreliable;

establishing, by the server system, responsive to receiving the identifier from the first client device, a second connection between the first client device and a second server of the server system;

instantiating, by the server system, responsive to establishing the second connection between the first client device and the second server, a temporary second dispatcher component different from the first dispatcher component;

identifying, by the server system, using the temporary second dispatcher component, a second event of the events according to the position of the first event in the event stream as indicated by the received identifier;

queuing, by the server system, using the first dispatcher component, one or more further events added to the event stream during instantiation of the temporary second dispatcher component;

generating, by the server system, a second message based on the second event;

providing, by the second server, the second message to the first client device;

generating, by the server system, responsive to a signal indicating suspension or removal of the temporary second dispatcher component, one or more further messages based on the queued one or more further events; and providing, using the first dispatcher component, the one or more further messages to the first client device.

16. The computer program product of claim 15, the instructions further configurable to cause:

responsive to identifying the second event, identifying, using the first dispatcher component, a third event of the events;

generating a third message based on the third event, the third message comprising a further identifier; and responsive to providing the second message to the first client device, providing, by the second server, the third message to the first client device.

17. The computer program product of claim 15, wherein the temporary second dispatcher component is configured to identify events associated only with the first client device.

18. The computer program product of claim 15, the instructions further configurable to cause:

removing the temporary second dispatcher component in response to providing the second message to the first client device.

19. The computer program product of claim 15, wherein the determination that the first connection is unreliable is based on one or more reliability indicators, the reliability indicators comprising one or more of: whether memory usage of the first server exceeds a memory usage threshold, whether one or more hypertext transfer protocol services of the first server are identifiable, or whether the first server is identifiable in the event stream.

20. The computer program product of claim 15, wherein the first message further comprises event content from a group of events identified by the first dispatcher component, each event of the first group of events being associated with an identical event type.

\* \* \* \* \*